United States Patent [19]

Jou

[11] Patent Number: 5,480,273
[45] Date of Patent: Jan. 2, 1996

[54] BOLT ASSEMBLY

[76] Inventor: Yuch-Chiou Jou, No. 49 Linyun Street, Baan Chyau City, Taipei Hsien, Taiwan

[21] Appl. No.: 302,054

[22] Filed: Sep. 7, 1994

[51] Int. Cl.⁶ .............................. F16B 19/00; F16B 33/00
[52] U.S. Cl. .......................... 411/373; 411/396; 411/409; 16/121
[58] Field of Search ..................................... 411/371, 372, 411/373, 374, 396, 409, 431; 16/117, 121

[56] References Cited

U.S. PATENT DOCUMENTS

| | | | |
|---|---|---|---|
| 4,000,539 | 1/1977 | Neyer | 16/121 |
| 4,413,374 | 11/1983 | Ferdinand et al. | 411/373 X |
| 5,067,750 | 11/1991 | Minneman | 411/373 X |
| 5,104,270 | 4/1991 | Ritzl | 411/85 |
| 5,107,068 | 5/1991 | Cooksey | 411/373 |

FOREIGN PATENT DOCUMENTS

| | | | |
|---|---|---|---|
| 2100913 | 7/1972 | Germany | 16/117 |
| 1561972 | 3/1980 | United Kingdom | 16/121 |

*Primary Examiner*—Neill R. Wilson
*Attorney, Agent, or Firm*—Bacon & Thomas

[57] ABSTRACT

A bolt assembly includes a knob having an aperture formed in a hub. The hub includes three ears extended radially outward. A bolt is engaged in the aperture and includes a head engaged in the hub. A cap includes three flanges extended radially inward for engaging with the ears so as to secure the cap to the knob. A spring is engaged between the cap and the head of the bolt for biasing the head of the bolt to engage with the hub. The knob and the bolt may be easily changed when the cap is disengaged from the hub. An element is engaged in the hub for engaging with a smaller bolt.

3 Claims, 2 Drawing Sheets

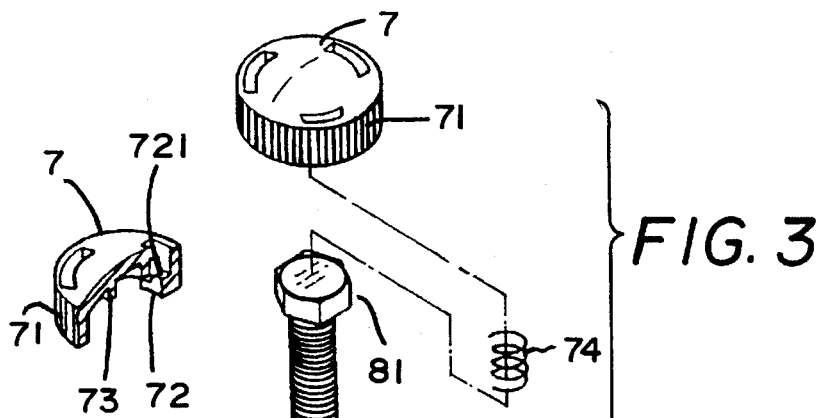
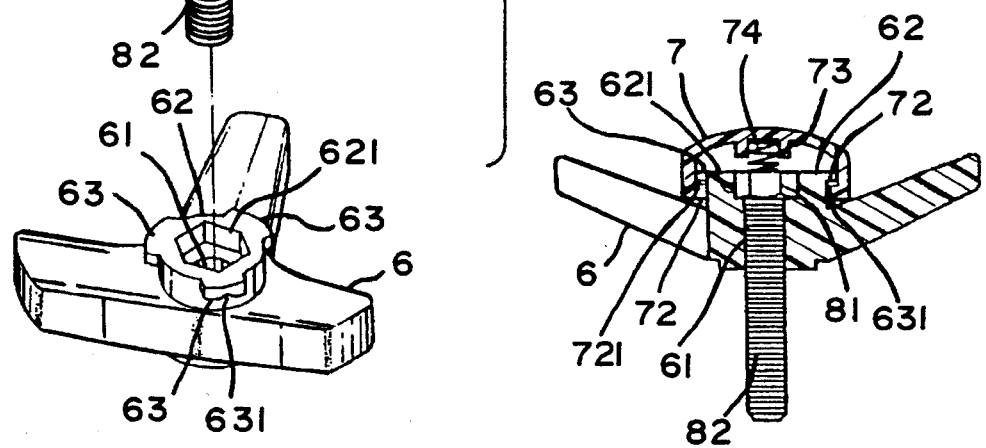
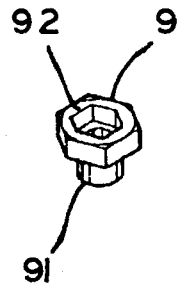

BOLT ASSEMBLY

BACKGROUND OF THE INVENTION

1. Field of the Invention

The present invention relates to a bolt, and more particularly to a bolt assembly. 2. Description of the Prior Art A typical bolt assembly is shown in FIG. 1 and comprises a bolt body 2 having a head 23 formed integral within a molded knob 1 and having an outer thread 21 formed in the outer peripheral portion and having a lower end portion 22 for engaging with nut means. The knob 1 is made of plastic materials and may be easily damaged. The whole bolt assembly should be discarded when the knob 1 is damaged.

Another typical bolt assembly is shown in FIG. 2 and comprises knob 3 having a hub 31 formed in the center portion and having an aperture 32 formed in the hub 31. A bolt 4 includes a head 41 for engaging in the hub 31 and includes a lower end 42 for engaging into the aperture 32. The bolt 4 includes an outer thread 43 for engaging with a nut 5 so as to be secured to the knob 3. However, the knob 3 may also be easily damaged by the bolt and nut when the nut is over threaded relative to the bolt.

The present invention has arisen to mitigate and/or obviate the afore-described disadvantages of the conventional bolts.

SUMMARY OF THE INVENTION

The primary objective of the present invention is to provide a bolt assembly in which the bolt can be easily engaged in the knob and the bolt can be easily changed.

In accordance with one aspect of the invention, there is provided a bolt assembly comprising a knob including a hub formed thereon and including an aperture formed therein, the hub including a first engaging recess formed therein, the hub including an upper portion having ear means extended radially outward therefrom, a bolt engaged in the aperture of the knob and including a head for engaging with the first engaging recess of the hub, a cap engaged on the hub and including a bottom portion having flange means extended radially inward therefrom for engaging with the ear means so as to secure the cap to the knob, and means for biasing the head of the bolt to engage with the first engaging recess of the hub.

The ear means includes cavity means formed therein, and the flange means includes projection means formed thereon for engaging with the cavity means so as to position the cap to the knob.

An element is further provided to be engaged in the first engaging recess of the hub and including a stub for engaging in the aperture of the knob, the element including a second engaging recess having a smaller size than the first engaging recess.

Further objectives and advantages of the present invention will become apparent from a careful reading of a detailed description provided hereinbelow, with appropriate reference to accompanying drawings.

BRIEF DESCRIPTION OF THE DRAWINGS

FIG. 3 is an exploded view of a bolt assembly in accordance with the present invention;

FIG. 4 is a partial cross sectional view of the bolt assembly;

FIG. 5 is a perspective view illustrating the cap, in which one half of the cap is cut off; and FIG. 6 is a perspective view showing an element for changing bolt of different size.

DETAILED DESCRIPTION OF THE PREFERRED EMBODIMENT

Figure 1:
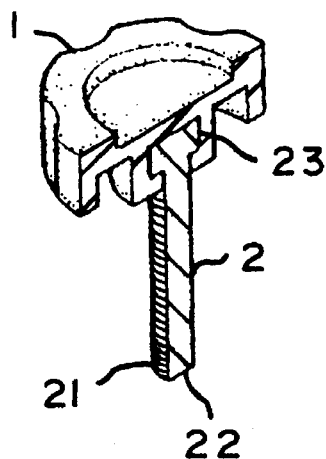
FIG. 1 is a perspective view of a typical bolt assembly, in which one half of the typical bolt assembly is cut off.
Figure 2:
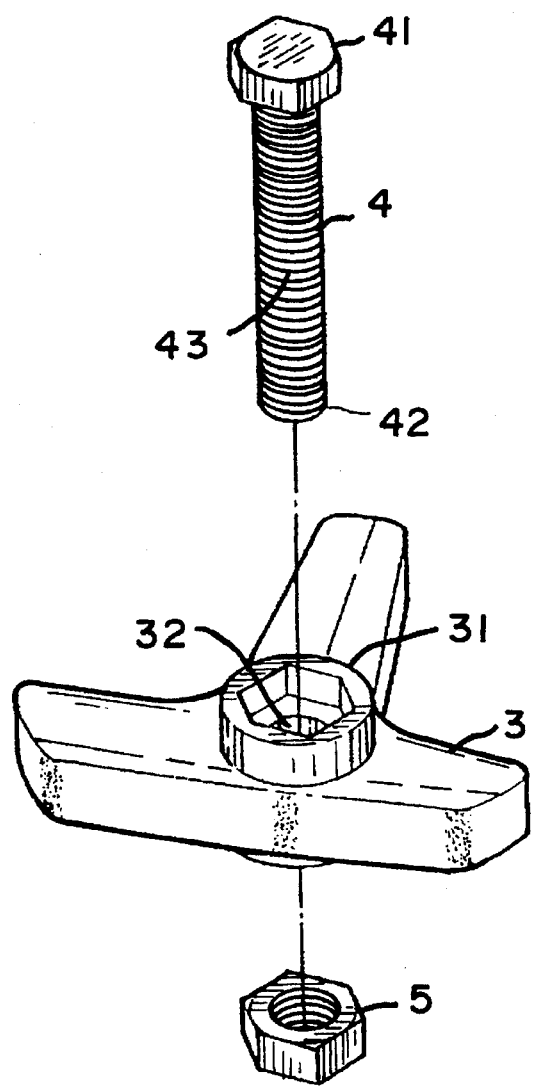
FIG. 2 is an exploded showing another typical bolt assembly.

Referring to the drawings, and initially to FIGS. 3 to 5, a bolt assembly in accordance with the present invention comprises a knob 6 including a hub 62 formed in the center portion and including an aperture 61 formed in the hub 62 for engaging with a bolt 8. The hub 62 includes an engaging recess 621 formed therein for engaging with the head 81 of the bolt 8 which includes an outer thread 82. The hub 62 includes an upper portion having three ears 63 extended radially outward therefrom. The ears 63 each includes a cavity 631 formed in the bottom portion. A cap 7 includes three flanges 72 extended radially inward from the bottom portion thereof for engaging with the ears 63. The flanges 72 each includes a projection 721 for engaging with the cavities 631 of the ears 63 so as to position the cap 7 to the knob 6. The cap 7 includes an embossment outer surface 71 for facilitating rotation of the cap 7. A hub 73 is formed in the cap 7 for engaging with a spring 74 which is biased between the cap 7 and the head 81 of the bolt 8 so as to bias the head 81 of the bolt 8 to engage with the engaging recess 621 of the hub 62. Either the knob 6 or the bolt 8 may be easily changed or replaced with a bland new one when the cap 7 is disengaged from the knob 6 and when the knob 6 or the bolt 8 is damaged.

Referring next to FIG. 6, an element 9 is engaged in the engaging recess 621 of the hub 62 and includes a stub 91 for engaging with the aperture 61 and includes an engaging recess 92 of smaller size than that of the engaging recess 621 so as to engage with a bolt of smaller size than that of the bolt 8. Accordingly, bolts of smaller size may also be engaged with the knob 6.

Accordingly, the bolt assembly in accordance with the present invention includes a bolt and a knob that may be easily changed or replaced with a bland new one.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A bolt assembly comprising:

a knob including a hub formed thereon and including an aperture formed therein, said hub including a first engaging recess formed therein, said hub including an upper portion having ear means extended radially outward therefrom, a bolt engaged in said aperture of said knob and including a head for engaging with said first engaging recess of said hub, a cap engaged on said hub and including a bottom portion having flange means extended radially inward therefrom for engaging with said ear means so as to secure said cap to said knob, and means for biasing said head of said bolt to engage with said first engaging recess of said hub.

2. A bolt assembly according to claim 1, wherein said ear means includes cavity means formed therein, and said flange means includes projection means formed thereon for engaging with said cavity means so as to position said cap to said knob.

3. A bolt assembly according to claim 1 further comprising an element engaged in said first engaging recess of said hub and including a stub for engaging in said aperture of said knob, said element including a second engaging recess having a smaller size than said first engaging recess.

* * * * *